United States Patent
Mullet et al.

[11] Patent Number: 6,073,430
[45] Date of Patent: Jun. 13, 2000

[54] ROTARY MOWER UP-FLOW CUTTING DECK

[75] Inventors: Paul W. Mullet, Hesston; Elmer D. Voth, Newton; Brian L. Nebel, Hesston, all of Kans.

[73] Assignee: Excel Industries, Inc., Hesston, Kans.

[21] Appl. No.: 09/060,388

[22] Filed: Apr. 14, 1998

[51] Int. Cl.[7] .......................... A01D 87/10; A01D 67/00; A01D 34/03

[52] U.S. Cl. ................ 56/13.4; 56/12.8; 56/13.3; 56/16.7; 56/320.2; 56/DIG. 20

[58] Field of Search ............... 56/6, 16.7, 320.1, 56/320.2, DIG. 8, DIG. 20, 12.8, 13.3, 13.4

[56] References Cited

U.S. PATENT DOCUMENTS

| | | | |
|---|---|---|---|
| 3,469,376 | 9/1969 | Bacon | 56/320.1 |
| 3,916,606 | 11/1975 | Brudnak, Jr. et al. | 56/13.4 |
| 4,121,405 | 10/1978 | Wolf | 56/12.9 |
| 4,263,771 | 4/1981 | Iaboni et al. | 56/13.4 |
| 4,364,221 | 12/1982 | Wixom | 56/13.6 |
| 4,407,112 | 10/1983 | Shepherd et al. | 56/13.4 |
| 4,996,829 | 3/1991 | Saitoh et al. | 56/13.3 |
| 5,012,633 | 5/1991 | Ito et al. | 56/12.9 |
| 5,035,108 | 7/1991 | Meyer et al. | 56/13.4 |
| 5,205,112 | 4/1993 | Tillotson et al. | 56/2 |
| 5,251,430 | 10/1993 | Matsumoto et al. | 56/17.5 |
| 5,267,429 | 12/1993 | Kettler et al. | 56/295 |
| 5,765,346 | 6/1998 | Benter et al. | 56/2 |
| 5,845,475 | 12/1998 | Busboom et al. | 56/320.1 |
| 5,884,466 | 3/1999 | Willmering et al. | 56/320.1 |

*Primary Examiner*—Eileen Dunn Lillis
*Assistant Examiner*—Gary S. Hartmann
*Attorney, Agent, or Firm*—Edward L. Brown, Jr.

[57] ABSTRACT

A multi-blade mower deck having a center right and left blade chambers, which are partially connected to each other, each blade chamber including a rotary mounted cutting blade with lifting sails thereon for rotating and lifting the air into each blade chamber, a front skirt defining portions of said blade chamber; a continuous rear skirt wrapping around rear portions of each of said blade chambers; and a fan chamber positioned above the cutting deck and concentrically aligned over the center blade chamber and having an opening into the center fan chamber including concentrically mounted impeller blades for driving air and clipping from the fan chamber through a exhaust passage positioned over the cutting deck.

13 Claims, 5 Drawing Sheets

ROTARY MOWER UP-FLOW CUTTING DECK

The present invention relates to rotary type grass mower decks and more particularly to multiple blade decks with a secondary fan chamber over the deck to exhaust the clippings in a passage over the deck.

BACKGROUND OF THE INVENTION

Multiple blade mowing decks are of either the side discharge type or a rear discharge configuration, such as taught in applicant's U.S. Pat. No. 4,916,887. There are certain advantages to a rear discharged deck such as the safety factor of better shielding from objects thrown from the blades. A rear discharge deck also permits the mower to trim close to an obstruction on either side, rather than a single side as is the case with the side discharge mower, which has an extending discharge chute on one side. Also the clippings are deposited on the cut swath and not onto undesirable areas such as a sidewalk or drive.

The advantage of a side discharge deck is that it provides a much better quality of cut by reason of the rear skirt which wraps around each of the cutting blades and provides a maximum suction or lifting of the grass along the back half of each blade chamber.

As a rotary blade and deck move over uncut grass, there is an initial cutting as the blade sweeps across the front half of the deck. The second cutting of that same area takes place as the blade swings across the rear half of the deck. It is important to have good suction or lift across the rear half of the deck to avoid leaving uncut grass. With a conventional rear discharge deck, the air and grass clippings flowing out the rear portion of the skirt diminish the quality of the cut achieved by the rear half of the deck.

Most rotary cutting blades not only provide a cutting edge for the grass, but they also provide an upturned trailing edge of the blade acting as an axial flow fan to lift the air and clippings from the plane of rotation from the blade and directing the clippings into a discharge chute for collection. The turned up rear edges of the cutting blades, referred to as sails, provide the basic suction of air and clippings through the bottom of the deck in conventional decks. In cutting decks with multiple blades, the pattern of air flow and clippings will vary with designs, as illustrated in U.S. Pat. No. 4,114,353 and in the Applicant's above mentioned '877 patent.

In many multiple blade decks, the combined lifting force of the sails on the multiple blades does not produce sufficient suction to lift the clippings into a hopper, and a secondary fan device is required as typically shown in the U.S. Pat. No. 3,657,865 along with the above mentioned patents.

In single blade rotary mowers, the concept of using a secondary fan over the cutting blade is taught in numerous forms through the use of a concentrically mounted fans in U.S. Pat. Nos. 4,263,771; 4,407,112; 5,012,633; 4,121,405; 3,696,595 and Australian Patent No. 264,584.

The rear discharge multiple blade decks of the prior art take the clippings discharge through the rear skirt of the deck, as taught in applicant's above mentioned '887 Patent, which diminishes the quality of the cut since there is no longer strong suction along the rear skirt.

SUMMARY OF THE INVENTION

The present invention is a multi-blade mowing deck, having a secondary fan chamber concentrically positioned over one of the blade chambers which provides additional suction to the cutting blades of the deck so as to exhaust the clippings through an exhaust passage positioned above the deck so as not to interfere with suction in the rear half of the deck. An impeller blade in the fan chamber is positioned directly over one of the cutting blade chambers. The fan chamber is partially closed to provide optimum position and suction for the air flow and the clippings entering from each of the adjacent blade chambers.

It is therefore the principal object of the present invention is to provide a multiple blade rear discharge mowing deck having a continuous rear skirt surrounding portions of each of the blade chambers.

Another object of the present invention is to provide a multiple blade mowing deck having a secondary fan chamber concentrically positioned above the deck, whereby the clipping exhaust passage is located above the deck.

Another object of the present invention is to provide a multiple blade mowing deck on a lawn mower tractor with a secondary fan chamber positioned concentrically above one of the blade chambers and a restriction plate positioned between the fan chamber and the cutting chamber so as to optimize the position and flow of air and clippings from all of the blade chambers into the fan chamber.

A further object of the present invention is to provide a multiple blade mowing deck having a secondary fan chamber of slightly greater diameter than the blade chamber.

DETAILED DESCRIPTION OF THE PREFERRED EMBODIMENT

Figure 1:
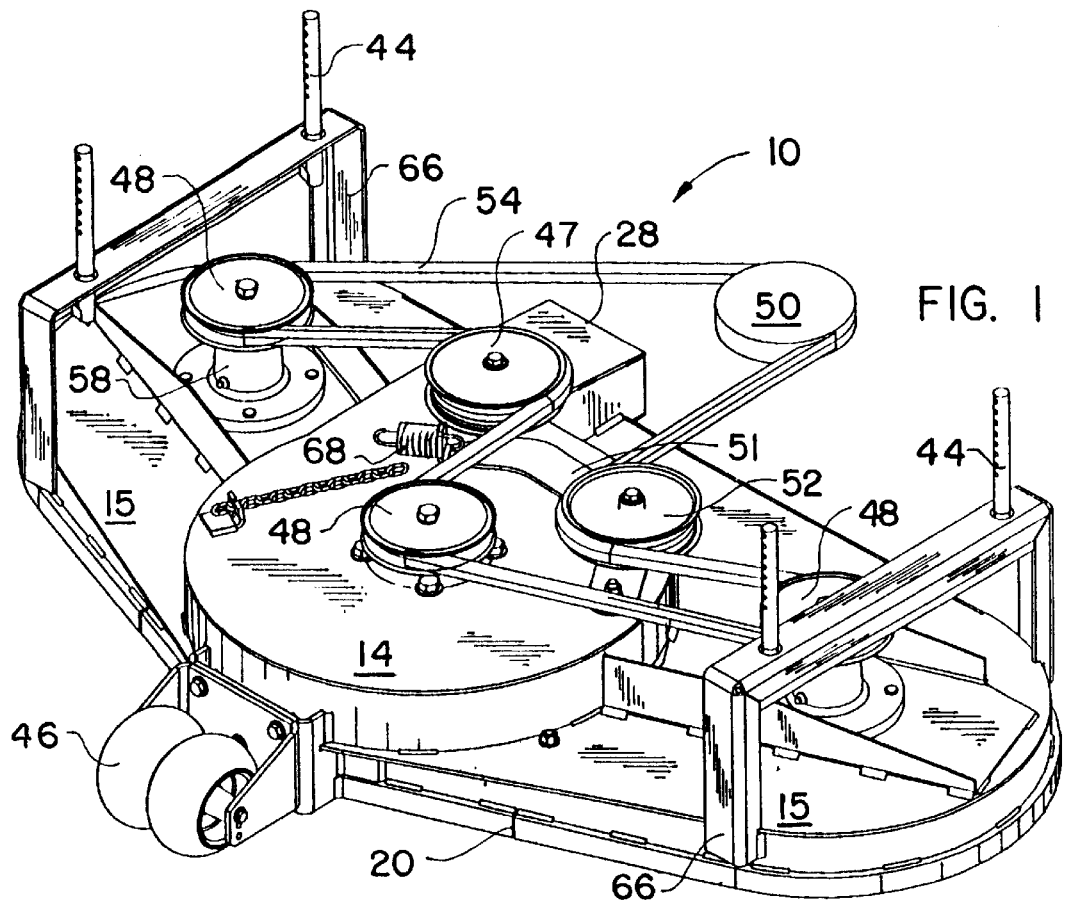
FIG. 1 is a perspective view of a multiple blade rear discharge mowing deck, viewed from the top left side with the mowing tractor not shown.
Figure 2:
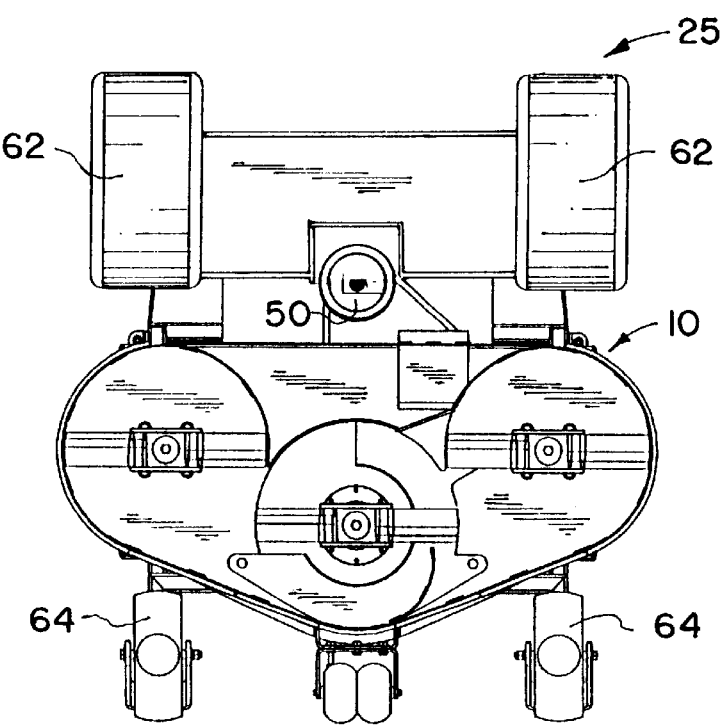
FIG. 2 is a bottom view of the mowing deck of the present invention attached to a mowing tractor.

Referring to the drawings and more specifically to FIG. 1, the multiple blade mower deck of the present invention is generally described by reference numeral 10. The mower deck 10 is suspended between the rear and front wheels 62 and 64 of a lawn mowing tractor 25, as shown in FIG. 2. The tractor 25 is powered, steered, and supported by a pair of differential drive wheels 62 along with a pair of castoring front wheels 64. Differential drive tractors of this type are well-known in the grass mowing art. The power to drive the deck 10 is provided through sheave 50, as seen in FIGS. 1 and 2 which in turn drive each of the three cutting blade spindles 58 through sheaves 48 and a rubber V-belt 54. The deck 10 is adjustably suspended to the frame of the tractor 25 through a series of four vertical height adjustment rods 44 which support the deck 10 through a pair of U-shaped brackets 66. Spring biased pulley 52 mounted on arm 51 maintains proper tension on belt 54 as the deck 10 shifts up and down on rods 44.

Figure 3:
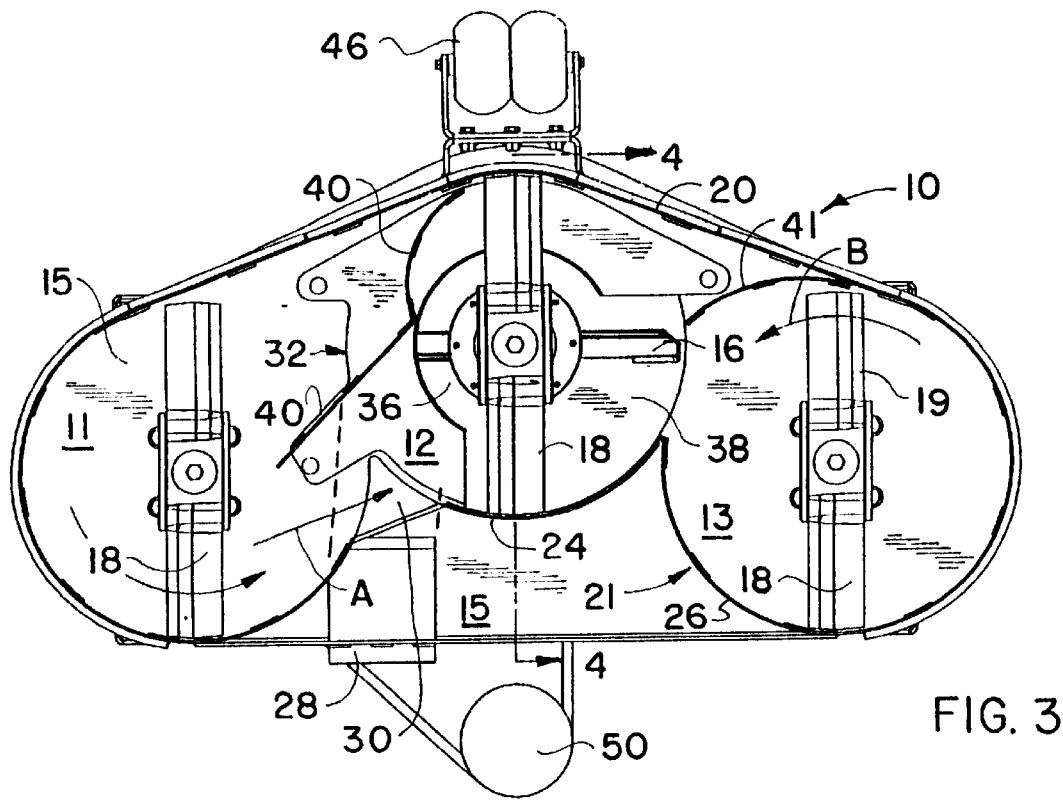
FIG. 3 is a bottom view of the mowing deck.

The mowing deck 10 is fabricated with a top panel 15 surrounded by a front skirt 20 and a rear skirt 21. When viewing the bottom of the deck front FIG. 3, blade chambers 11, 12 and 13 are shown in a conventional configuration with the center blade chamber 12 positioned slightly ahead of the right and left blade chambers 11 and 13 respectively. The three blade chambers are opened to each other so the grass clippings and air from the outer chambers 11 and 13 can flow into the center of cutting chamber 12 with counterclockwise rotation of cutting blades 18, as seen in FIG. 3 as indicated by arrows A & B. On the back edge of cutting blades 18 are sails 19, commonly known in the art, which lift and rotate the air creating suction along the periphery of the blade chambers.

Figure 7:
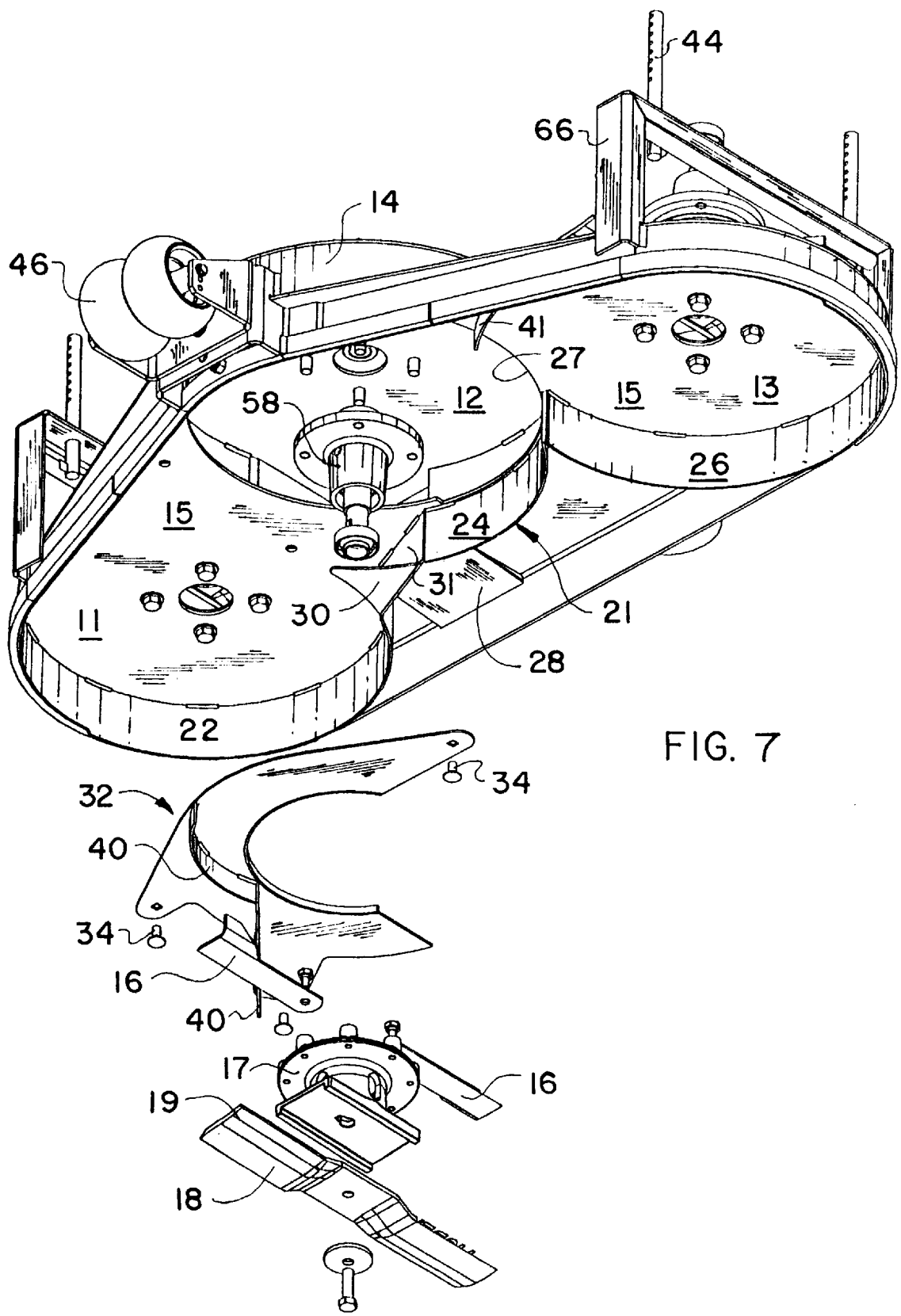
FIG. 7 is an exploded perspective view of the mowing deck from the underside thereof; and, FIG. 8 is a similar perspective view to FIG. 7 except in an assembled condition.
Figure 8:
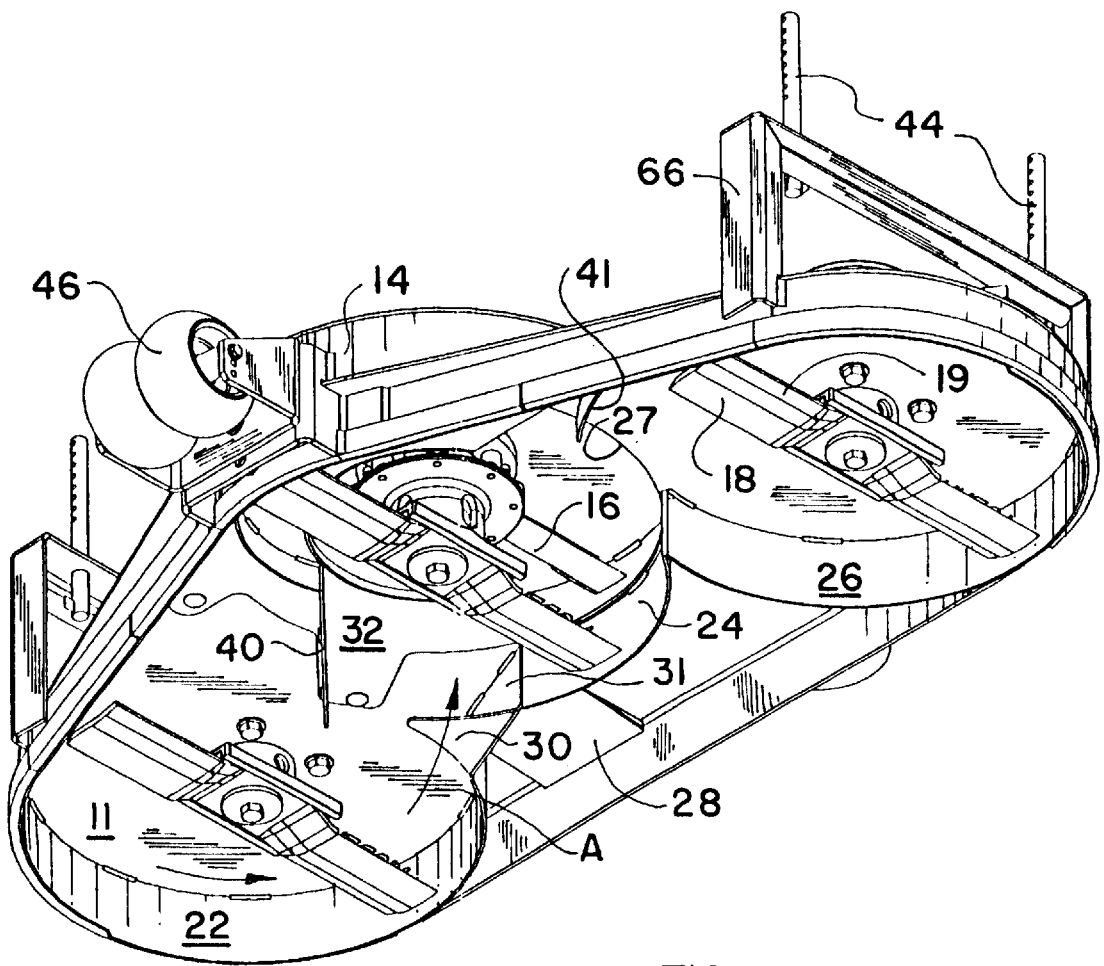

Located directly above center blade chamber 12 is a fan chamber 14 which includes a plurality of impeller blades 16 pivotally mounted on hub 17 as seen in FIGS. 7 and 8. Hub 17 and cutting blade 18 are mounted on a common spindle and bearing 58 carried by fan chamber 14. Impeller blades 16 include paddles at their outer ends positioned, normal to their plane of rotation to drive the air and clippings centrifically through exhaust passage 28, as seen in FIGS. 1 and 7. The exhaust passage 28, also referred to as the bagging chute, is tangential to fan chamber 14 and is positioned over the cutting chambers of the deck 10 and extends rearwardly. Passage 28 could extend laterally sideways for a side discharge if desired or upwards at any particular angle desired to lift the clippings into a hopper.

Figure 4:
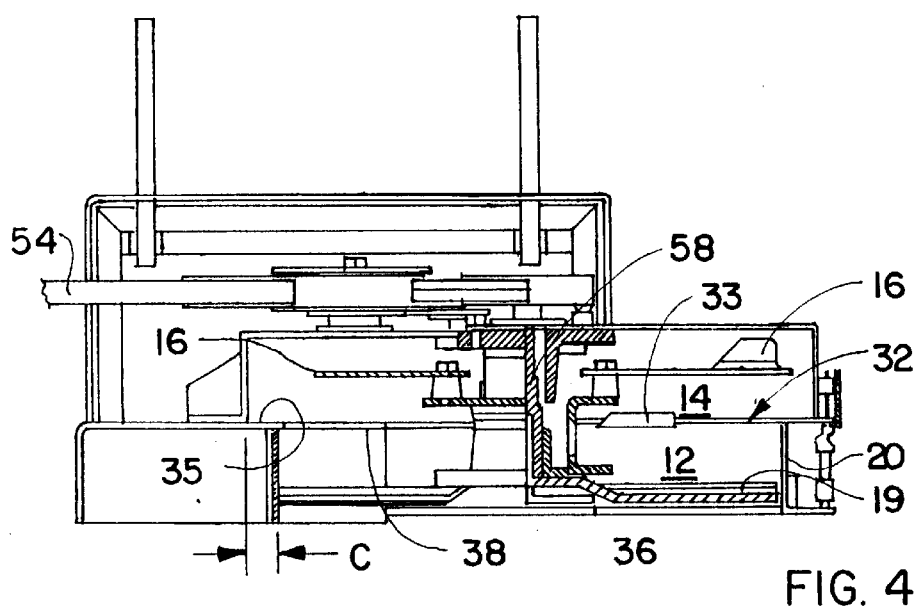
FIG. 4 is a sectional view taken along lines 4—4 of FIG. 3.
Figure 5:
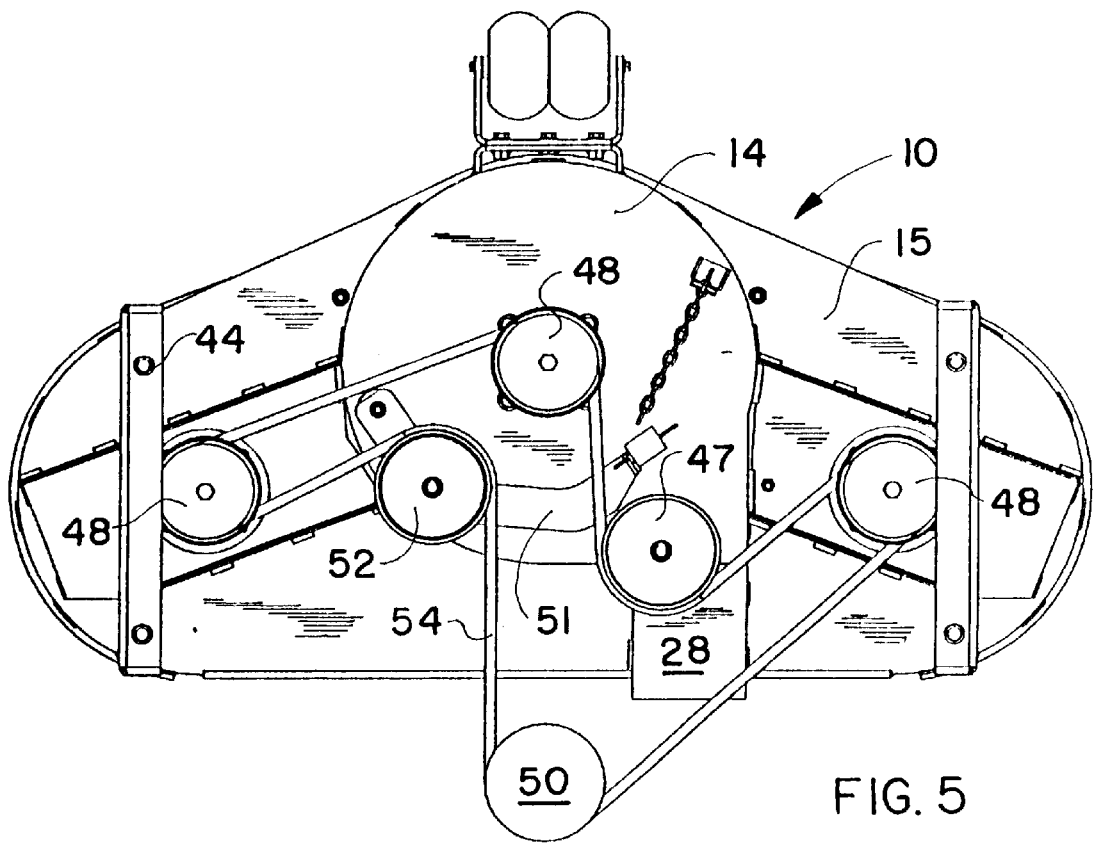
FIG. 5 is a top view of the mowing deck.
Figure 6:
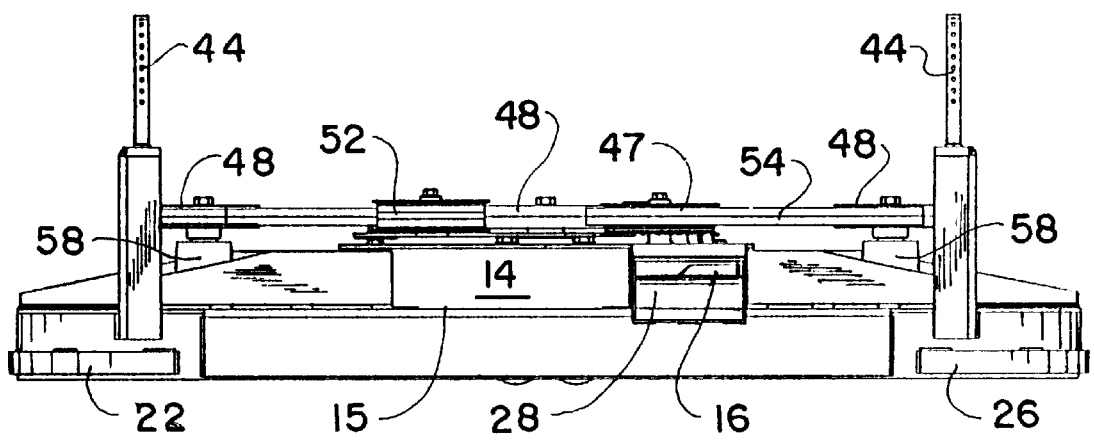
FIG. 6 is a rear view of the mowing deck.

As best seen in FIG. 4, fan chamber 14 has a slightly greater diameter than cutting blade chamber 12, as indicated by dimension C, which can be up to 3 inches. This creates a ledge 35 at the bottom of fan chamber 14. This ledge helps to contain the increased pressures created in the outer periphery of the fan chamber 14 by the action of the rotating impeller blades 16. Ledge 35 and upturned flange 33 both assist in preventing reverse air flow into cutting chamber 12.

The three blade chambers 11, 12 and 13 are defined by front and rear skirts 20 and 21 and a top panel 15, as best seen in FIG. 7. Fan chamber 14 positioned directly above blade chamber 12 are open to each other through a large circular opening 27 in top panel 15. This large opening 27 is partially blocked by restrictor plate 32 which is removed in FIG. 7 and in place in FIG. 8. Restrictor plate 32 is removably mounted in place by a series of bolts 34 and when in place separates blade chamber 12 from the fan chamber 14. The opening into the fan chamber 14 includes an annular opening 36, as best seen in FIG. 3, around hub 17. Joining annular opening 36 is a 90° segmented opening 38 which extends the full radius of the blade chamber 12 and is positioned in the lower right-hand quadrant, as viewed in FIG. 3. Attached to restrictor plate 32 is a baffle 40 which turns the grass clippings and air toward the center of blade chamber 12 to exhaust those clippings into either the annular opening 36 or the segmented opening 38. A portion of baffle 40 extends into a cutting chamber 11 to deflect the air and clippings in that chamber, indicated by arrow A, toward the openings 36 and 38. Included in blade chamber 13 is a baffle 41 which turns the air flow and clippings from chamber 13 toward opening 38 in center chamber 12, as indicated by arrow B. Both baffles 40 and 41 extend downwardly only a partial depth of the skirt 20 with sufficient clearance above the sails 19 on blade 18.

Rear skirt 21 which wraps around the rear side of blade chambers 11, 12 and 13, as best seen in FIG. 8, is made up of arcuate segments 22, 24 and 26. A portion of segments 22 and 24 is cut away and replaced by a straight wall 31 to let the clippings in chamber 11 pass into cutting chamber 12, as indicated by arrow A, and be exhausted through openings 36 and 38. Positioned above that cut out portion is a fillet plate 30 which provides the extended intersection point of skirt segments 22 and 24. This fillet plate 30 provides an optimum suction along the rear halves of each of the three cutting blade chambers. The straight portion of baffle 40 also assists in directing the air and clippings from chamber 11 into chamber 12.

OPERATION

Mowing deck 10 can close trim on either side due to its rear discharge design. Deck 10 also provides an optimum cut due to the fact rear skirt 21 fully surrounds each of the cutting blade chambers 11, 12 and 13, and thereby provides the maximum amount of lift or suction in the rear halves of each of the cutting chambers due to the sails 19 on the rotating blades 18 lifting the air in each blade chamber. With the discharge passage 28 of the deck positioned in a plane above the top of the blade chambers, there is no interference with the air suction along the rear skirt of the deck. Ground engaging rollers 46 attached to the front of the deck 10 will lift the deck on rods 44 when the ground is engaged.

While the invention has been described with a certain degree of particularity as to cutting blade chamber geometry, it is manifest that many changes may be made in the details of the construction and the arrangement of the chambers and number of chambers without departing from the spirit and scope of this disclosure. It is understood that the invention is not limited to the embodiment set forth herein for purposes of exemplification, but it is only by the scope of the attached claims including a full range of equivalency to which each element is entitled.

What is claimed is:

1. A multiple blade mowing deck for mounting on a lawn mowing tractor comprising:

a multiple blade cutting deck having a top and open on the bottom thereof, the cutting deck is attached to and powered by said tractor, the cutting deck having a center, right and left blade chambers therein which are partially connected to each other, each blade chamber including a rotatably mounted cutting blade with a lifting sail thereon for rotating and lifting the air into each blade chamber, and spindle concentrically mounted therein;

a front skirt defining portions of said blade chambers;

a continuous rear skirt wrapping around rear portions of each of said blade chambers;

a fan chamber positioned above the cutting deck and concentrically aligned over the center blade chamber, and open thereto including concentrically mounted impeller blades for driving air and clippings from said fan chambers;

an exhaust passage positioned over the cutting deck connected to the fan chamber, extending away from the fan chamber to a discharge opening.

2. A multiple blade mower deck as set forth in claim 1 including a restrictor plate positioned between the center blade chamber and the fan chamber for providing a restricted entry opening between the fan chamber and the center blade chamber.

3. A multiple blade mower deck as set forth in claim 1 including a restrictor plate positioned between the center blade chamber and the fan chamber for providing a restricted entry opening between the fan chamber and the center blade chamber and a baffle member in the center blade chamber directing the air flow towards said restricted entry opening into the fan chamber.

4. A multiple blade mower deck as set forth in claim 1 including a removable restrictor plate positioned between the center blade chamber and the fan chamber for providing a restricted entry opening between the fan chamber and the center blade chamber, a curved baffle member in the center blade chamber directing the air flow towards the restricted entry opening into the fan chamber and the restricted plate being shaped to provide an angular opening of between 80° and 150° in the rear left quadrant of the center blade chamber.

5. The multiple blade mower deck as set forth in claim 1 wherein the rear skirt includes arcuate segments and a straight segment located between the center and right blade chamber to permit the air flow in the right blade chamber to pass centrifugally into the center chamber and a fillet plate positioned over the straight segment to provide optimum suction of air into the cutting deck along the rear skirt.

6. A multiple blade mower deck as set forth in claim 1 including a restrictor plate positioned between the center blade chamber and the fan chamber for providing a restricted entry opening between the fan chamber and the center blade chamber, a curved baffle member in the center blade chamber directing the air flow towards the restricted entry opening into the fan chamber, the restrictor plate being shaped to provide an angular opening of at least 90° in the rear left quadrant of the center blade chamber and a reduced diameter annular opening surrounding the rotating cutting blade and spindle.

7. A multiple blade mower deck as set forth in claim 1 including a restrictor plate positioned between a blade chamber and the fan chamber for providing a restricted entry opening between the fan chamber and the center blade chamber and a curved baffle member in the center blade chamber directing the lifted air flow towards the restricted entry opening into the fan chamber and a second curved baffle member in the left blade chamber directing the air flow towards the restricted entry opening into the fan chamber.

8. A multiple blade mower deck as set forth in claim 1 wherein the rear skirt is shaped to the outside diameter of each rotatably mounted blades to provide maximum air suction along the rear skirt.

9. A multiple blade mowing deck for mounting on a law mowing tractor comprising:

a multiple blade cutting deck having a top and a open bottom; the cutting deck is attached to and powered by said tractor, the cutting deck having at least two blade chambers therein which are partially connected to each other, each blade chamber including a rotatably mounted cutting blade with a lifting sail thereon for rotating and lifting the air into each blade chamber and spindle concentrically mounted therein;

a front skirt defining portions of said blade chambers;

a continuous rear skirt wrapping around rear portions of each of said blade chambers;

a fan chamber positioned above the cutting deck and concentrically aligned with one of said blade chambers and open thereto including concentrically mounted fan blades for drawing air and clippings from said blade chambers;

an exhaust passage positioned over the cutting deck connected to the fan chamber, extending to a discharge opening.

10. A multiple blade mower deck as set forth in claim 9 including a restrictor plate positioned between the blade chamber and the fan chamber thereover for providing a restricted entry opening between the fan chamber and the blade chambers.

11. A multiple blade mower deck as set forth in claim 9 including a restrictor plate positioned between a blade chamber and the fan chamber thereover for providing a restricted entry opening between the fan chamber and the blade chambers and a curved baffle member in the blade chamber under the fan chamber directing the air flow towards the restricted entry opening into the fan chamber.

12. A multiple blade mower deck, as set forth in claim 9, wherein the fan chamber has a larger diameter than the blade chamber over which it is positioned and an inwardly directed flange on the fan chamber connected to said blade chamber.

13. A multiple blade mower deck as set forth in claim 9 wherein the mowing deck has three blade chambers and the fan chamber is positioned above the middle cutting deck.

* * * * *